Jan. 18, 1938.  G. L. SCHOFIELD  2,105,823
AUTOMOBILE FRONT END SUPPORTING MECHANISM
Filed Nov. 21, 1934  2 Sheets-Sheet 1
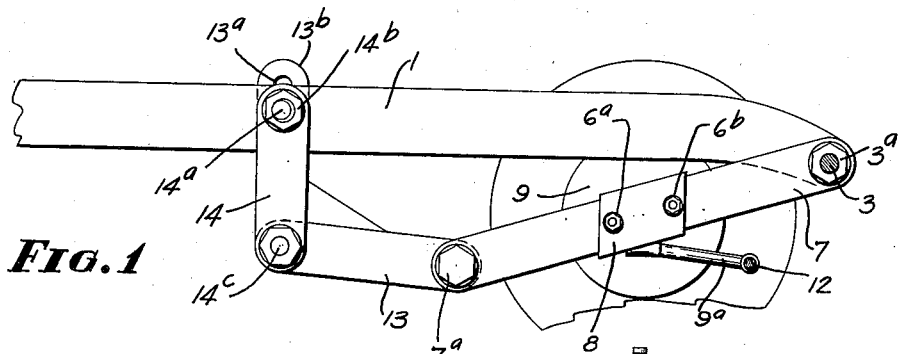
FIG.1
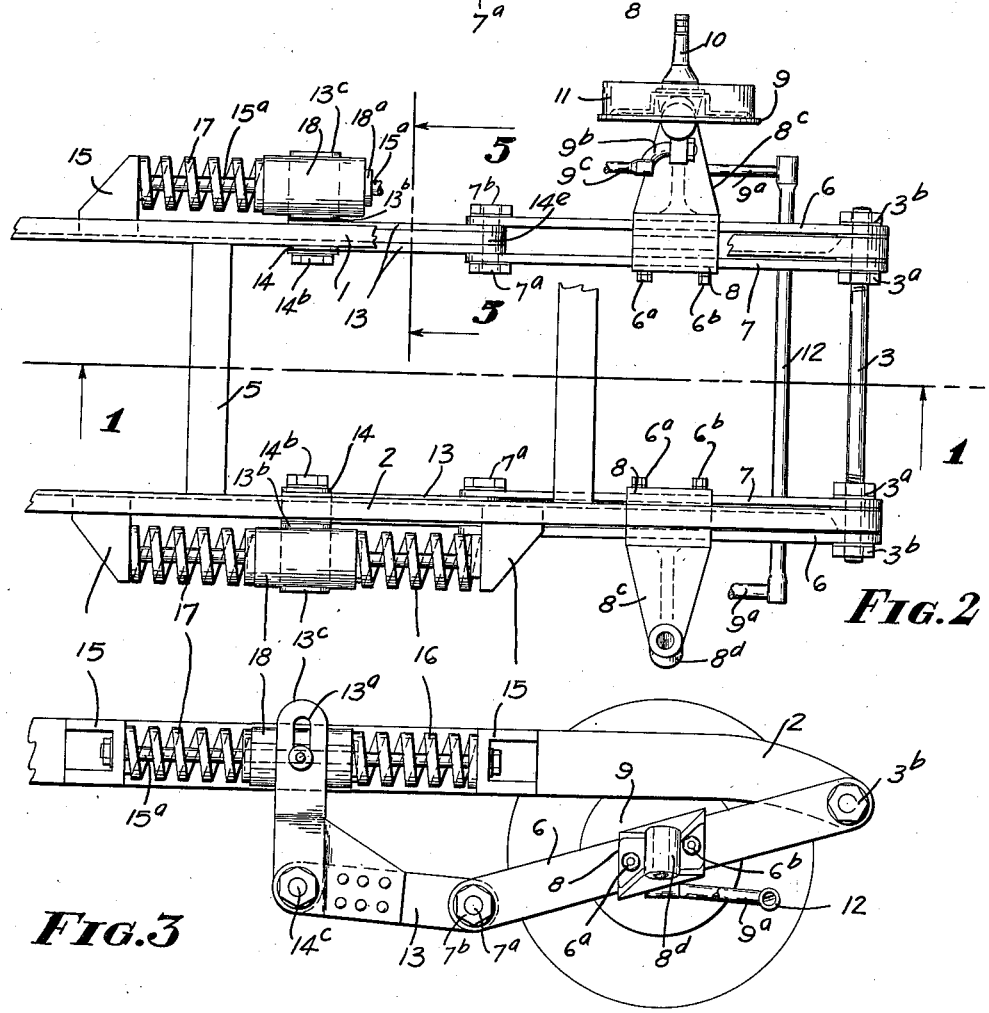
FIG.2
FIG.3
INVENTOR
George L. Schofield
BY
A. B. Bowman
ATTORNEY Jan. 18, 1938.  G. L. SCHOFIELD  2,105,823
AUTOMOBILE FRONT END SUPPORTING MECHANISM
Filed Nov. 21, 1934  2 Sheets-Sheet 2

INVENTOR
George L. Schofield
BY
A.B.Bowman
ATTORNEY

Patented Jan. 18, 1938

2,105,823

UNITED STATES PATENT OFFICE 2,105,823

AUTOMOBILE FRONT END SUPPORTING MECHANISM

George L. Schofield, National City, Calif., assignor to said George L. Schofield, as trustee for Carrie L. Schofield, Georgia Louise Schofield Geer, and Elizabeth Susan Schofield Stacy-Judd, Los Angeles, Calif, Application November 21, 1934, Serial No. 754,095

9 Claims. (Cl. 280—124)

My invention relates to automobile front end supporting mechanism, and the objects of my invention are:

First, to provide a mechanism of this class which eliminates the necessity of a front axle;

Second, to provide a mechanism of this class which provides both spring action and spring rebound support for the front end of the vehicle;

Third, to provide a mechanism of this class by the use of which one wheel may be raised considerably higher than the other without rocking or twisting the frame;

Fourth, to provide a mechanism of this class which is readily adaptable to automobile frames now in use with but slight changes, therefore may be used as attachment for automobile frames now in use;

Fifth, to provide a mechanism of this class which provides great flexibility between the frame and wheel structure;

Sixth, to provide a mechanism of this class which simplifies the steering rod connection;

Seventh, to provide a mechanism of this class which provides great flexibility and resiliency between the wheels and body of the automobile at the front end; and Eighth, to provide a mechanism of this class which is very simple and economical of construction, durable, easy to install, easy to operate, and which is very efficient in its action.

Figure 4:
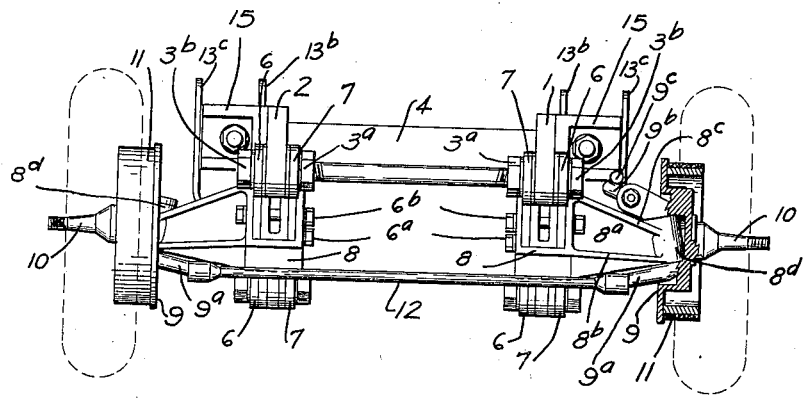
Figure 5:
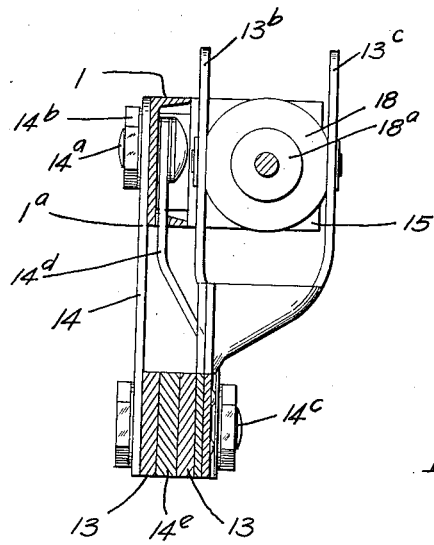

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a longitudinal sectional view of my automobile front end mechanism from the line 1—1 of Fig. 2; Fig. 2 is a top or plan view of the frame and supporting mechanism of my front end supporting mechanism showing some of the parts broken away to facilitate the illustration; Fig. 3 is a side elevational view thereof omitting the wheel and axle connecting member; Fig. 4 is a front elevational view of this mechanism showing the wheels by dotted lines, and Fig. 5 is an enlarged sectional view from the line 5—5 of Fig. 2.

Similar characters of reference refer to similar parts and portions throughout the several views of the drawings.

The main frame members 1 and 2, frame cross members 3, 4 and 5, frame supporting levers 6 and 7, brackets 8, axle connecting members 9, axles 10, brake drums 11, steering connecting rod 12, bellcrank levers 13, bellcrank lever supports 14, spring supports 15, front springs 16, rear springs 17, and spring separator 18, constitute the principal parts and portions of my automobile front end supporting mechanism.

The main frame members 1 and 2 are the conventional type of main frame members which extend longitudinally of the body at opposite sides and may be of any shape or form desired. In this case I have shown them curved downwardly slightly at their front ends, as shown best in Figs. 1 and 3 of the drawings. These frame members 1 and 2 are rigidly secured together at their extreme front ends by means of a cross member 3 which is preferably a relatively large rod or shaft threaded at its opposite ends. These frame members 1 and 2 are also preferably connected together by means of cross members 4 and 5 which extend transversely between the members 1 and 2, as shown best in Fig. 2 of the drawings. Pivotally mounted at the front end of the members 1 and 2 on opposite sides thereof on the cross member 3 are the frame supporting levers 6 and 7, one on each side of each frame member, as shown best in Fig. 2 of the drawings. These members 6 and 7 are held in their proper relation by means of nuts 3a and 3b on the opposite ends of the member 3. These members 6 and 7 extend downwardly and backwardly and are pivotally connected at their lower and back ends to bellcrank levers 13, one on each side of the frame, by means of bolts 7a and nuts 7b. These bellcrank members 13 are pivotally supported intermediate their ends by supports 14 which are supported in the frame by means of bolts 14a with nuts 14b and extend downwardly and are provided in their lower ends with bolts 14c for supporting the bellcrank members 13. Mounted on the bolt 14a is another support 14d which extends downwardly through a slot 1a in the main frame member 1, then extends outwardly, as shown best in Fig. 5 of the drawings, and is separated from the lower end of the member 14 by means of a spacer 14e, the bellcrank member 13 being pivotally supported relatively to the supports 14 and 14d at its lower end and extends upwardly in bifurcated form, and each of the bifurcated portions are provided with slots 13a in their upper ends to permit shifting of the upright portions of the bellcrank 13.

Mounted on the outer sides of the frame members 1 and 2 are spring supports 15 which are rigidly secured to the frame members at their outer sides, and supported thereon at their opposite ends are rod members 15a around which are mounted compression springs 16 and 17. Mounted between the springs 16 and 17 and around the rods 15a are spring separators 18 against which the ends of the springs 16 and 17 rest. This spring separator member 18 is adapted to reciprocate on the rod 15a and compress the springs 16 and 17 with the shifting of the upright portion of the bellcrank lever 13, the springs 16 and 17 being the supporting springs between the automobile wheels and the frame of the automobile. The spring separators 18 are provided with reduced extended portions 18a for supporting the ends of the springs in their proper position relative to the spring separator members 18.

Rigidly secured to the frame supporting levers 6 and 7 on each side are the brackets 8 which extend upwardly over the outer sides of each of the members 6 and 7 and are bolted thereon by means of bolts 6a and 6b. Extending laterally from the main portion of this bracket member is an extended portion 8a which consists of a vertical web and two transverse web portions 8b and 8c and secured on the extended end of these extended portions 8a, 8b and 8c is a cylindrical lug member 8d which is preferably positioned on an angle slightly to the vertical to provide better steering qualities. This member 8d is adapted to receive the kingpin for the axle connecting members 9 upon which the axle members 10 are mounted. It will be noted that the axle connecting members extend over this portion 8d slightly and extend outwardly in flanged relation adapted to receive the brake drums 11, thus providing a support for the brake drums for the wheels. Secured to the member 9 centrally is the axle 10 for supporting the wheels of the automobile. Secured to the members 9 are the steering arms 9a which extend forwardly and to which are connected the steering connecting rod 12 which extends transversely across below the frame to opposite sides thereof, as shown best in Fig. 2 of the drawings. This member 9a is also provided with an extended steering arm 9b which connects with a conventional steering rod 9c.

The operation of my automobile front end supporting mechanism is as follows: The levers 6 and 7 move upwardly and downwardly pivoted at their front ends upon any variations in the road surface, which in turn tilts bellcrank 13 upon its pivotal mounting, the bolts 14c, which causes the compression and extension of the springs 16 and 17 because of the shifting of the separator member 18 longitudinally with the rod 15a, which provides a means of taking care of the action and reaction, thus eliminating any requirement for shock absorbers and providing for complete resilient spring action between the wheels of the automobile and the frame. The cross member 3 provides a rigid support upon which the members 6 and 7 are mounted and provides for taking care of the torque strain between the wheels and the frame.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In an automobile front end supporting mechanism, a pair of frame members extending substantially longitudinally of the body of the automobile, a pair of levers pivotally mounted on opposite sides of the front end of each frame member and extending downwardly and backwardly therefrom, wheels pivotally mounted intermediate the ends of each pair of said levers, bellcrank members pivotally connected between the lower backwardly extending ends of said levers and pivotally supported by said frame members intermediate their ends, and compression springs engaging the opposite sides of the one member of each of said bellcrank members and secured to said frame member.

2. In an automobile front end supporting mechanism, a pair of frame members extending substantially longitudinally of the body of the automobile, a pair of levers pivotally mounted on opposite sides of the front end of each frame member and extending downwardly and backwardly therefrom, wheels pivotally mounted intermediate the ends of each pair of said levers, bellcrank members pivotally connected between the lower backwardly extending ends of said levers and pivotally supported by said frame members intermediate their ends, compression springs engaging the opposite sides of the one member of each of said bellcrank members and secured to said frame member, and steering means in connection with said wheels.

3. In an automobile front end supporting mechanism, frame members longitudinally disposed with said automobile, lever members pivotally connected relatively to each other, one of said lever members being connected to said frame members near their front ends, the other lever member having an arm secured in connection therewith extending normally upwardly therefrom, spring means tending to hold said arm in its normal upright position, axles pivotally connected relatively to one of said lever members, means for pivoting said axles relatively to said levers, and supporting means extending across said frame members at their front ends upon which the front portions of said levers are pivotally mounted.

4. In an automobile front end supporting mechanism, a pair of frame members extending substantially longitudinally of the body of the automobile, a cross member at the front end connecting said frame members, frame supporting levers pivotally connected at the front ends of said frame members, brackets secured to the outer sides of said frame supporting levers and extending outwardly therefrom at opposite sides of each of said frame members, axle connecting members pivotally connected with said brackets and provided with steering arms in connection therewith, bellcrank levers pivotally connected with the extended ends of said frame supporting levers and pivotally mounted on the frame members backwardly from their front ends, and spring means mounted on said frame members in engagement with the other members of said bellcrank levers tending to hold them in substantially upright position.

5. In an automobile front end supporting mechanism, a pair of frame members extending substantially longitudinally of the body of the automobile, a cross member at the front end connecting said frame members, frame supporting levers pivotally connected at the front ends of said frame members, brackets secured to the outer sides of said frame supporting levers and extending outwardly therefrom at opposite sides of each of said frame members, axle connecting members pivotally connected with said brackets and provided with steering arms in connection therewith, bellcrank levers pivotally connected with the extended ends of said frame supporting levers and pivotally mounted on the frame members backwardly from their front ends, spring means mounted on said frame members in engagement with the other members of said bellcrank levers tending to hold them in substantially upright position, and steering mechanism in connection with said steering arms.

6. In an automobile front end supporting mechanism, the combination with the longitudinal frame members of an automobile of a pair of wheel connecting lever members in spaced relation to each other pivotally disposed at one end on the opposite sides of the front end of each of said frame members, bell crank members in spaced relation pivotally connected with the spaced free ends of said spaced lever members, spring means between said bell crank members and said frame members, and bridged supports extending from opposite sides of each longitudinal frame member for supporting said bell crank members, whereby said levers and bell crank members are braced against side strain or torsion strain from the offsetting of the wheel.

7. In an automobile front end supporting mechanism, the combination with the longitudinal frame members of an automobile of a pair of wheel connecting lever members in spaced relation to each other pivotally disposed at one end on the opposite sides of the front end of each of said frame members, bell crank members in spaced relation pivotally connected with the spaced ends of said spaced lever members, bridged supports extending from opposite sides of each longitudinal frame member for supporting said bell crank members, whereby said levers and bell crank members are braced against side strain or torsion strain from the offsetting of the wheel, one member of said bell crank members extending upwardly past said longitudinal frame member, and spring means supported on said longitudinal frame member tending to hold said normally upward member in its normal upright position.

8. In an automobile front end supporting mechanism, the combination with the longitudinal frame members of an automobile of a pair of wheel connecting lever members in spaced relation to each other pivotally disposed at one end on the opposite sides of the front end of each of said frame members, bell crank members in spaced relation pivotally connected with the spaced ends of said spaced lever members, bridged supports extending from opposite sides of each longitudinal frame member for supporting said bell crank members, whereby said levers and bell crank members are braced against side strain or torsion strain from the offsetting of the wheel, one member of said bell crank members extending upwardly past said longitudinal frame member, spring means supported on said longitudinal frame member tending to hold said normally upward member in its normal upright position, and brackets secured to both of said lever members intermediate their ends.

9. In an automobile front end supporting mechanism, the combination with the longitudinal frame members of an automobile of a pair of wheel connecting lever members in spaced relation to each other pivotally disposed at one end on the opposite sides of the front end of each of said frame members, bell crank members in spaced relation pivotally connected with the spaced ends of said spaced lever members, bridged supports extending from opposite sides of each longitudinal frame member for supporting said bell crank members, whereby said levers and bell crank members are braced against side strain or torsion strain from the offsetting of the wheel, one member of said bell crank members extending upwardly past said longitudinal frame member, spring means supported on said longitudinal frame member tending to hold said normally upward member in its normal upright position, brackets secured to both of said lever members intermediate their ends, and axles pivotally mounted on said brackets.

GEORGE L. SCHOFIELD.